United States Patent [19]
Cherukuri et al.

[11] Patent Number: 5,985,344
[45] Date of Patent: Nov. 16, 1999

[54] PROCESS FOR OBTAINING MICRONUTRIENT ENRICHED RICE BRAN OIL

[75] Inventors: Reddy Sastry V. Cherukuri; Rukmini Cheruvanky, both of Folsom, Calif.; Ike Lynch, Dillon, Mont.; Daniel L. McPeak, El Dorado Hills, Calif.

[73] Assignee: The RiceX Company, El Dorado Hills, Calif.

[21] Appl. No.: 09/144,839

[22] Filed: Aug. 31, 1998

Related U.S. Application Data

[60] Provisional application No. 60/057,850, Sep. 2, 1997.
[51] Int. Cl.$^6$ ..................................... A23D 9/04
[52] U.S. Cl. .................. 426/417; 426/430; 426/492; 426/493; 426/494; 554/12
[58] Field of Search .................................. 426/417, 601, 426/330.6, 425, 429, 430, 489, 492, 493, 494; 554/12

[56] References Cited

U.S. PATENT DOCUMENTS

| | | |
|---|---|---|
| 2,727,914 | 12/1955 | Gastrock et al. . |
| 3,122,565 | 2/1964 | Kijima et al. . |
| 3,852,504 | 12/1974 | Mihara .................................. 426/489 |
| 3,950,266 | 4/1976 | Chang .................................. 426/542 |
| 4,122,094 | 10/1978 | Woziwodzki . |
| 4,352,746 | 10/1982 | Bracco .................................. 426/429 |
| 4,380,506 | 4/1983 | Kimura .................................. 426/541 |
| 4,808,426 | 2/1989 | Strop et al. . |
| 4,971,660 | 11/1990 | Ribers .................................. 426/492 |
| 5,047,254 | 9/1991 | Lee . |
| 5,138,075 | 8/1992 | Ohgaki et al. . |
| 5,153,019 | 10/1992 | Hammond . |
| 5,175,012 | 12/1992 | Shin .................................. 426/489 |
| 5,204,373 | 4/1993 | Pearce . |
| 5,213,026 | 5/1993 | House . |
| 5,290,579 | 3/1994 | Hitotsumatsu et al. . |
| 5,292,537 | 3/1994 | Hammond .............................. 426/417 |
| 5,348,974 | 9/1994 | Wright et al. . |
| 5,376,390 | 12/1994 | Hammond .............................. 426/417 |
| 5,445,841 | 8/1995 | Arendt .................................. 426/489 |
| 5,512,307 | 4/1996 | Hammond .............................. 426/417 |
| 5,514,398 | 5/1996 | Imai et al. . |
| 5,516,923 | 5/1996 | Hebert et al. . |
| 5,552,167 | 9/1996 | Taylor et al. . |
| 5,591,772 | 1/1997 | Lane et al. . |
| 5,635,189 | 6/1997 | Horrobin et al. . |
| 5,707,673 | 1/1998 | Prevost .................................. 426/417 |
| 5,753,283 | 5/1998 | Hammond .............................. 426/417 |

FOREIGN PATENT DOCUMENTS

| | | |
|---|---|---|
| 0 333 472 A2 | 9/1989 | European Pat. Off. . |
| 52-68210 | 11/1971 | Japan . |
| 02131538 | 5/1990 | Japan . |
| 2 090 836 | 7/1982 | United Kingdom . |
| 2 117 381 | 10/1983 | United Kingdom . |
| 2 135 672 | 9/1984 | United Kingdom . |
| WO 91/17985 | 11/1991 | WIPO . |
| WO 97/42830 | 11/1997 | WIPO . |
| WO 98/01126 | 1/1998 | WIPO . |
| WO 98/01519 | 1/1998 | WIPO . |

OTHER PUBLICATIONS

Sayre et al 1985 Extraction and Refining of Edible Oil from Extrusion—Stabilized Rice Bran JAOCS62(6)1040–1043.
Orthoefer 1993 Rice Bran Oil Compositon & Characteristics Presented at the 84th AOCS Annual Meeting, Apr. 25–29, 1993 Anaheim, CA.
Orthoefer 1996 Rice Bran Oil: Heathy Lipid Source Food Technology Dec. 1996 p. 62–64.
Shin 1996 Changes of Endogenous Anti Oridants and Fatty Acid Composition in Irradiated Rice Bran during Storage J. Ag. Food Chem 44:567–573.
Hu 1996 Comparison of Iso Propanol and Hexane for Extraction of Vitamin E and Oryzanols from Stabilized Rice Bran JAOCS 73(:12) 1653–1656.
Proctor 1996 Ambrent—Temperture Extraction of Rice Bran Oil with Hexan and Isopropanol JAOCS 7(6) 811–813.
Yoon 1994 Oxidative Stability of High Fatty Acid Rice Bran Oil at Different Stages of Refining JAOCS 71(2) 227–229.

*Primary Examiner*—Carolyn Paden
*Attorney, Agent, or Firm*—Townsend and Townsend and Crew

[57] ABSTRACT

A simple and cost effective enrichment process for enhancing antioxidant content of rice bran oil from crude rice bran oil (CrRBO) is described. The process comprises extracting the CrRBO using alcohol at 25–77° C., obtaining the enriched rice bran oil (ERBO) from alcohol extracts which contain 74 to 300 percent more antioxidants than the starting CrRBO. The anti-oxidant enriched rice bran oil is useful in pharmaceutical, therapeutic, and dietary preparations.

32 Claims, 2 Drawing Sheets

PROCESS FOR OBTAINING MICRONUTRIENT ENRICHED RICE BRAN OIL

This application claims the benefit of U.S. Provisional Application 60/057,850 filed Sep. 2, 1997.

FIELD OF THE INVENTION

The present invention generally relates to novel methods for obtaining a micronutrient enriched rice bran oil, and more particularly to methods for obtaining antioxidant enriched rice bran oil prepared from crude rice bran oil using a novel solvent extraction technique.

BACKGROUND OF THE INVENTION

Rice bran oil has been touted to have a number of healthful benefits and uses. For example, House, U.S. Pat. No. 5,213,026, discloses the use of rice bran oil as a cooking oil. Hammond, U.S. Pat. No. 5,153,019, discloses a beverage product of rice bran and honey which is substantially free of spores, proteins, and coliform bacteria, and a whey protein concentrate. Taylor, U.S. Pat. No. 5,552,167, discloses a method for stabilizing high linolenic edible oils, such as soybean oil and canola oil, by blending the oils with rice bran oil in amounts effective to render the oils stable to oxidation. Imai, U.S. Pat. No. 5,514,398, discloses an additive for cholesterol-containing food that contains a rice bran component and/or derivative thereof as an active ingredient. Imai discloses that the rice bran oil component helps control blood cholesterol levels. Other studies disclose that a higher ratio of rice bran oil in a blended oil has a higher effectiveness for lowering cholesterol levels than the individual oils. Rice bran oil is also being promoted as an edible oil in China, Korean, Japan, and India. Studies done in these countries have shown a significant reduction in serum cholesterol and triglyceride levels within 15 to 30 days after including rice bran oil in one's diet. In Japan it has been reported that the effect can be seen within seven days.

Tocopherol and tocotrienols, collectively referred to as tocols, are monophenolic as well as lipophilic compounds and are present abundantly in rice bran oil as well as palm oil, soybean oil, sunflower oil and other oils. Tocols also occur widely in many plant tissues and other oil seeds.

Tocopherols are important biological anti-oxidants with vitamin E activity. Tocopherols that exhibit maximum vitamin E activity help prevent oxidation of lipids including polyunsaturated fatty acids. In addition, tocopherols are free radical scavengers and quench lipid free radicals. The anti-oxidant and free radical quenching properties coupled with the vitamin E activity of tocols make tocols useful in the treatment of various degenerative diseases such as aging, cancer, arthritis, damage to cells caused by air pollution and also in preventing coronary heart diseases.

It is well known that tocotrienols exhibit strong anti-oxidant activities or physiological activities. Pearce, U.S. Pat. No. 5,204,373, discloses that tocotrienols have been shown to inhibit cholesterol biosynthesis and cause a subsequent drop in LDL cholesterol, apolipo-protein B, thromboxane B2, platelet factor 4 and glucose levels. Kato, GB Pat. No. 2,117,381 A, discloses that tocotrienols have long been utilized as an antisterility drug for animals. Wright, U.S. Pat. No. 5,348,974, discloses the antioxidative activity of tocotrienols, which are known to play pivotal roles in the genesis of atherosclerotic plaques, thrombotic episodes, ischemic damage, cancer, aging, dementia, and inflammatory conditions. Physiological actions attributed to tocotrienols include decreasing serum cholesterol, decreasing hepatitic cholesterol synthesis and anti-tumor activity.

Gamma oryzanol (γ-oryzanol) is another important biological anti-oxidant present in rice bran oil in significant quantities. Important effects resulting from γ-oryzanol intake include decreasing plasma cholesterol, decreasing platelet aggregation, decreasing hepatitic cholesterol biosynthesis, increasing fecal bile acid excretion and decreasing cholesterol absorption. Gamma-oryzanol has also been used in treatments for nerve imbalance and menopause disorders.

Some definitions of terms which may be used throughout this patent:

Tocol—A mixture of one or more compounds selected from tocopherols (T), tocotrienols (T3), and tocotrienol-like (T3-like) compounds.

Tocotrienol-like compounds—Any biologically active compound that is contained in or derived from a biological source, and (1) which is released, or whose release is facilitated, upon stabilizing that source, or (2) whose recoverable amount in that source is increased by stabilizing that source. Such tocotrienol-like compounds include any biologically active compound displaying the biological activity of a tocotrienol which inhibits the activity of HMG-COA reductase as measured by an in-vitro HMG-COA reductase assay.

Tocotrienol-like compounds include, but are not limited to, any electron transfer ring compounds, anti-oxidant type compounds, redox compounds and compounds similar to or containing the three structural features that characterize the tocotrienols generally. Specific examples of T3-like compounds are ubiquinones, plastoquinones, isoquinones, phylloquinones, benzoquinones, flavanols, flavanoids, coumarins, unsaturated terpenoids and unsaturated isoprenoids. The term "T3-like compound" also encompasses analogues, homologs, isomers and derivatives of such compounds, such as prenylated derivatives or pyrolytic derivatives.

Gamma oryzanol (γ-oryzanol)—any ferulic acid ester of triterpenyl alcohols. As used herein, γ-oryzanol is any fraction containing ferulate esters of triterpene alcohols and plant sterols.

Common sterols include cholesterol, beta sitosterol, campesterol, cycloartenol, 24-methylene cycloartenol.

Enhanced—The state of a stabilized biological source, wherein the recoverable amount of the anti-oxidants, including tocols and γ-oryzanol, are increased beyond that normally recoverable from the biological source prior to stabilization.

General methods of obtaining crude rice bran oil from rice bran are known. For example, a process for extracting rice bran oil from rice bran is disclosed in Gastrock, U.S. Pat. No. 2,727,914. The process disclosed in Gastrock involves mildly cooking the rice, crisping the cooked particles, and then mixing with a solvent, such as hexane, and subjecting the resulting slurry to filtration. Imai, U.S. Pat. No. 5,514,398, discloses the following conventional method for extracting the components of rice bran: extracting oily components from rice bran with a solvent such as hexane, degumming, dewaxing and alkali refining these oily components, subjecting the oil to solid/liquid separation and distilling the residue, followed by a solvent-extraction and column treatment.

Mamuro, British Pat. No. GB 2 090 836 A, discloses a method for the preparation of a tocotrienol concentrate from oleaginous material, such as rice bran oil, comprising the following steps:

(a) dissolving or extracting an oleaginous material containing tocotrienols in or with a nonpolar organic solvent such as hexane to form a tocotrienol-containing solution;

(b) contacting the tocotrienol-containing solution with an anion-exchange resin whereby the tocotrienols are absorbed on the anion-exchange resin; and (c) eluting the tocotrienols with an eluant out of the anion-exchange resin to give an eluate solution containing the tocotrienols.

More recently, Lane, U.S. Pat. No. 5,591,772, disclosed two separate protocols for extracting rice bran oil from stabilized rice bran using hexane and steam. Additionally, Lane discloses techniques for enhancing the yield of tocotrienol compounds by dissolving a tocotrienol rich fraction in hexane, and then binding the dissolved tocotrienol rich fraction to an amino column (1 ml) and then selectively eluting compounds using a solvent that does not elute impurities. However, this process is limited to selectively eluting a few tocotrienols and does not enhance the overall tocol content of rice bran oil.

Given the benefits of anti-oxidant products and the potential uses for rice bran oils, there is a need for a rice bran oil that is enriched with anti-oxidant products, including γ-oryzanol and tocol products, so that the benefits of rice bran oil are better realized.

SUMMARY OF THE INVENTION

The present invention provides a process for obtaining a rice bran oil having an enhanced anti-oxidant content. The process includes mixing rice bran oil and a lower aliphatic alcohol and allowing the resulting mixture to settle thereby forming a first oil layer and a first alcohol layer. The first alcohol layer is separated from the first oil layer and is then distilled to recover rice bran oil having an enhanced anti-oxidant content.

More specifically, the present invention provides a method for recovering enriched rice bran oil (ERBO) by mixing crude rice bran oil (CrRBO) with a lower alkanol such as a C1 to C6 alcohol; stirring the mixture for about one-half hour to about one hour allowing to settle, so that it separates into an oil layer and an alcohol layer; separating the alcohol layer from the oil layer; and distilling the alcohol layer under vacuum to recover a rice bran oil having an enhanced amount of anti-oxidant products, including tocols and γ-oryzanol. In order to obtain maximum enrichment, it is preferable to repeat the extraction process with the residual oil layer for a total of 3 to 4 times with each extraction being carried out for about one-half hour to about one hour. Preferably, a C1 to C3 alcohol such as methanol, ethanol, or isopropanol is used. The extraction procedure is preferably carried out at a temperature between 5° C. and 80° C., and more preferably either at room temperature (about 25° C.) or by using alcohols preheated from about 40° C. to about 77° C.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
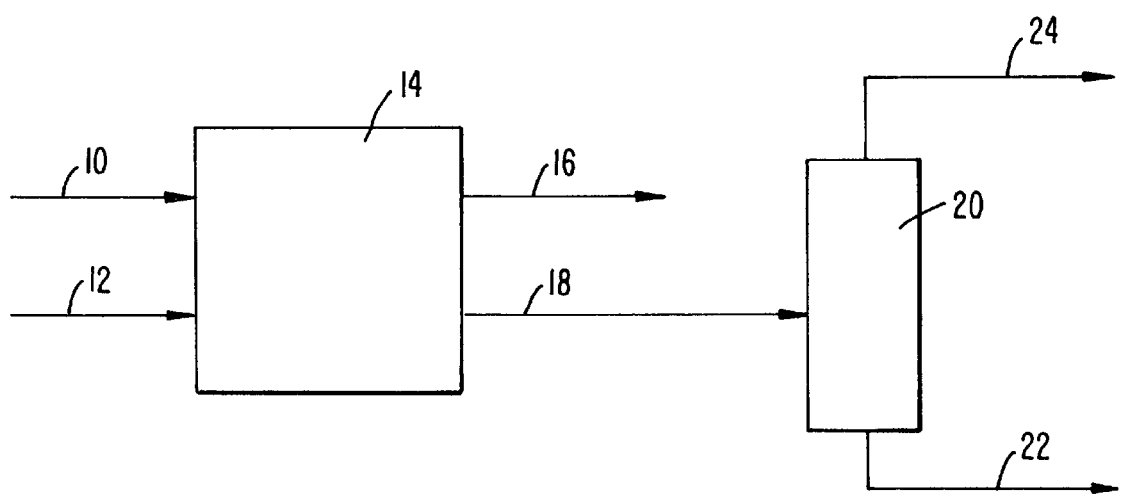
FIG. 1 is a schematic diagram generally illustrating a system for implementing an embodiment of the method of the present invention.

FIG. 1 is a schematic diagram illustrating a system for implementing an embodiment of a method of obtaining micronutrient enriched rice bran oil according to the present invention. Crude rice bran oil (CrRBO) 10 is mixed with alcohol 12 in mixer 14. Alcohol 12 is any lower aliphatic alcohol, preferably saturated. Alcohol 12 in one embodiment includes any C1 to C6 alcohol. However, C1 to C3 alcohols are preferred. The mixture is stirred vigorously for a period of about one-half hour to one hour and allowed to settle so that an oil layer 16 and an alcohol layer 18 are formed. Alcohol layer 18 is separated from oil layer 16 by any conventional method such as by using a separating funnel. Alcohol layer 18 is then distilled in a suitable vessel 20 resulting in enriched rice bran oil (ERBO) 22. In preferred aspects, vessel 20 is a short path vacuum distillation (SPVD) unit having a thin film evaporator as will be discussed in more detail below. The volatiles 24 can be discarded or recycled for other extractions.

Figure 2:
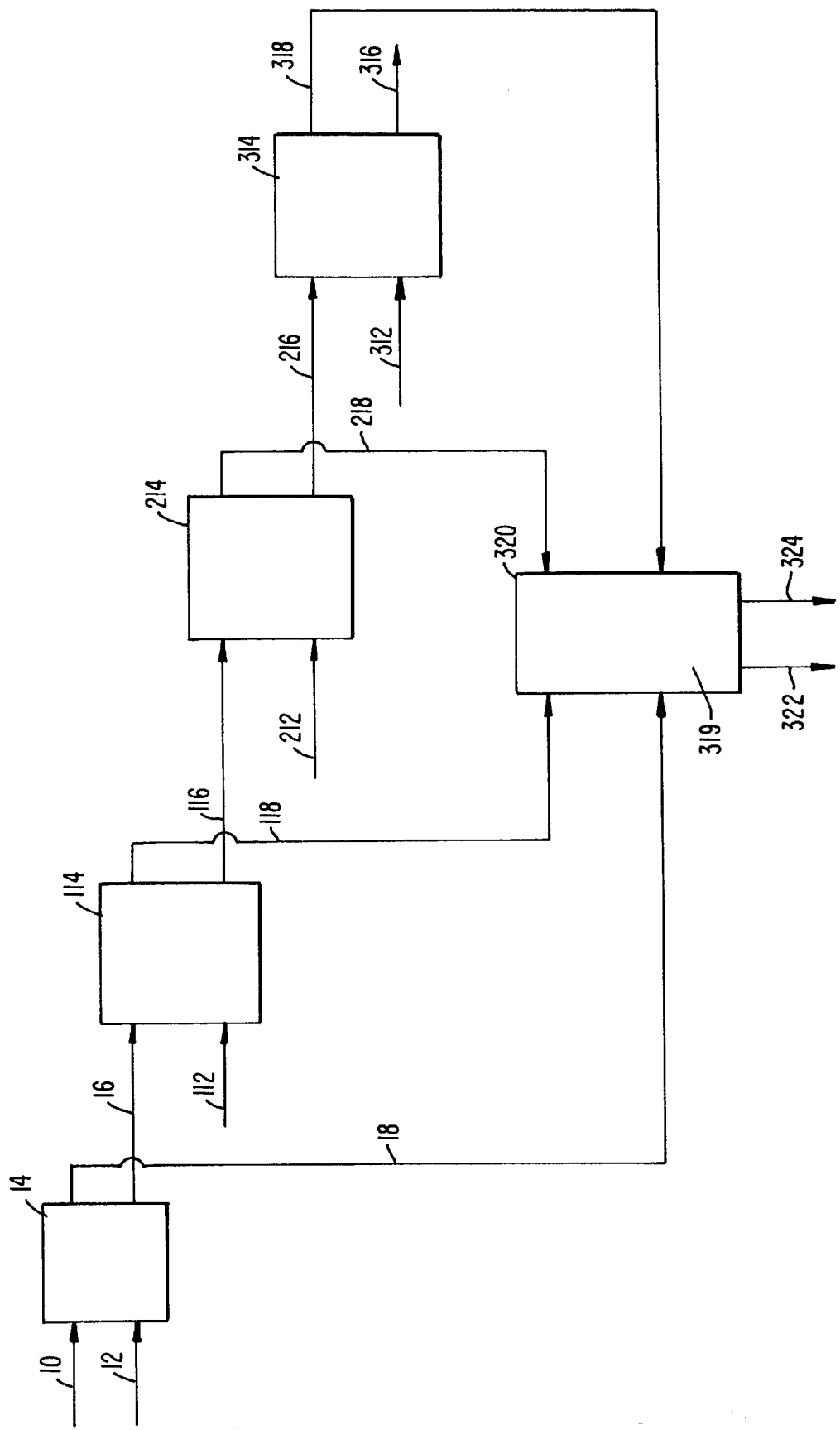
FIG. 2 is a schematic diagram illustrating a system for implementing a preferred embodiment of the method of the present invention.

In order to obtain maximum yield of the enriched rice bran oil, it is preferable to repeat the step of extracting the residual oil layer 16 two or three more times with each extraction being carried out for about one-half hour to about one hour. FIG. 2 illustrates a system for implementing a preferred method of obtaining micronutrient enriched rice bran oil according to the present invention. As shown in FIG. 2, alcohol layer 18 is not distilled immediately. Rather, oil layer 16 is mixed with a fresh batch of alkanol 112 in mixer 114. The mixture is stirred vigorously for a period of about one-half hour to one hour and allowed to settle so that an oil layer 116 and an alcohol layer 118 are formed. Alcohol layer 118 is separated from oil layer 116 using any conventional method. Oil layer 116 is mixed with a fresh batch of alkanol 212 in mixer 214. The mixture is stirred well for a period of about one-half hour to one hour and allowed to settle so that an oil layer 216 and an alcohol layer 218 are formed. Alcohol layer 218 is separated from oil layer 216 using any conventional method. In preferred aspects, the step of extracting is repeated twice. However, in an embodiment where the step of extracting is repeated a third time, oil layer 216 is mixed with a fresh batch of alkanol 312 in mixer 314. The mixture is vigorously stirred for a period of about one-half hour to one hour and allowed to settle so that an oil layer 316 and an alcohol layer 318 are formed. Alcohol layer 318 is separated from oil layer 316 using any conventional method. All separated alcohol layers, for example, alcohol layer 18, alcohol layer 118, alcohol layer 218, and alcohol layer 318, are combined into a mixture 319 and placed in a suitable vessel 320 for distilling. The combined mixture 319 is concentrated under vacuum at about 40° C. to about 60° C. resulting in enriched rice bran oil (ERBO) 322. In preferred aspects, vessel 320 is a short path vacuum distillation (SPVD) unit having a thin film evaporator as will be discussed below. The volatiles 324 can be discarded or recycled for other extractions.

The extraction procedure is preferably carried out either at room temperature (about 25° C.) or by using alcohols preheated from about 40° C. to about 77° C., depending on the specific alcohol used. C1 to C3 alcohols are preferred because with the higher solubility of rice bran oil (RBO) in alcohols of a higher molecular weight, it may be more difficult to separate the resulting oil and alcohol layers as described above. The quantity of alcohol used for each extraction is preferably from about two to about three parts by volume for one part of CrRBO by weight. For example, in one embodiment, the ratio of alcohol to rice bran oil is in a range of about 2 ml to about 3 ml of alcohol per gram of rice bran oil. More preferably, the quantity of alcohol used for each extraction is about two parts by volume for one part of CrRBO by weight.

ERBO can also be prepared by subjecting CrRBO or refined, bleached and deodorized rice bran oil (RBO) to short path vacuum distillation (SPVD) under the process conditions described below. This process provides a tocol enhancement of about 150% to about 775%, and an unexpected enhancement of γ-oryzanol of more than 800%.

Distillation is preferably carried out using an SPVD unit. The SPVD unit includes an evaporator, preferably a thin film evaporator. The evaporator provides greater surface contact of the oil to the heat. In operation, oil is caused to drip down the evaporator surface. A portion of the oil evaporates off and is collected as is well known. The collected portion includes enhanced amounts of anti-oxidants, including tocols and γ-oryzanol as shown in the examples below. The vacuum pressure conditions of the SPVD unit allows for lower temperatures to be used in the distillation process. In preferred aspects, distillation using the SPVD unit is carried out at a temperature in a range of about 200° C. to about 290° C. under a vacuum pressure in a range of about 0.001 mmHg to about 0.01 mmHg, and more preferably at a temperature in a range of about 230° C. to about 245° C. under a vacuum pressure in a range of about 0.002 mmHg to about 0.006 mmHg.

Current data indicates enhancement of anti-oxidants using the methods of the present invention. The ERBO 322 produced by the preferred embodiment of the present invention provides approximately 74% to 300% enriched rice bran oil with a 31% to 45% yield. Yield is based on the weight of the original CrRBO. Enrichment is based on HPLC analysis of CrRBO and the ERBO for tocol products. CrRBO contains 1500 to 2000 ppm of tocols and about 12,000 ppm of γ-oryzanol. HPLC analysis of ERBO obtained from the presently preferred embodiment of the method indicated approximately 74% to 300% enhancement of tocols (over 4800 ppm) and about 80% to 90% enhancement of γ-oryzanol (about 20,000 ppm). The residual CrRBO 316 contained 200 to 350 ppm of tocols. The alcohol recovery was 85 to 90% and the recovered alcohol 324 could be recycled for use in further enrichment experiments. Table 1 is a table illustrating experimental results. Table 2 is a table that further details the results shown in Table 1 with a breakdown of the tocol content in each sample of enriched rice bran oil.

Examples of experiments conducted according to the present invention:

EXAMPLE 1

CrRBO (50.2 g) was stirred with preheated reagent grade alcohol (150 ml) for one-half hour and allowed to settle. The residual oil was separated from the alcohol layer and extracted two more times with fresh lots of preheated alcohol (150 ml). The alcohol extracts were combined and the solvent was completely distilled off under reduced pressure at 50° C. to give 19.1 g (38.1%) of enriched rice bran oil (ERBO). The residual oil (27.94 g) was found to contain 248.8 ppm of total tocols and the ERBO was analyzed with results as follows:

| | HPLC ANALYSIS (ppm) | | | | | | | | | | |
|---|---|---|---|---|---|---|---|---|---|---|---|
| Product | α-T | α-T3 | β-T3 | γ-T | γ-T3 | δ-T | δ-T3 | T | T3 | T + T3 | γ-Ory |
| ERBO | 1703.6 | 1092.6 | 60.3 | 332.6 | 1465.5 | 24.7 | 65.0 | 2060.9 | 2683.4 | 4744.1 | 18116.5 |
| CrRBO | 741.8 | 531.2 | 25.4 | 138.0 | 603.5 | 8.6 | 35.7 | 887.8 | 1195.8 | 2084.6 | 10385.0 |

CrRBO obtained by conventional methods was analyzed to assess the initial levels of tocols and γ-oryzanol using high-performance liquid chromatography (HPLC). After enrichment using the methods of the present invention, the levels of tocols and γ-oryzanol in the resulting ERBO were again measured. Results of sample experiments are shown below. RiceX® brand rice bran oil was used in the experiments detailed below. Other commercially available rice bran oils can be used, however, with substantially similar results as the experiments detailed below. Examples of other commercially available brands of rice bran oils include RITO brand and Tsuno® brand rice bran oils.

EXAMPLE 2

CrRBO (50.25 g) was stirred with reagent grade ethyl alcohol (100 ml) at room temperature (25° C.) for one-half hour and the residual oil was separated from the alcohol extract. Extraction of the residual oil was repeated two more times with 100 ml each of ethyl alcohol. The combined alcohol extracts were concentrated as described under example 1 to give 17.8 g (35.4%) of enriched rice bran oil (ERBO). The residual oil (30.75 g) and the ERBO were analyzed for tocols and γ-oryzanol using HPLC. The residual oil was found to contain 253.1 ppm of total tocols and the ERBO was analyzed with results as follows:

| | HPLC ANALYSIS (ppm) | | | | | | | | | | |
|---|---|---|---|---|---|---|---|---|---|---|---|
| Product | α-T | α-T3 | β-T3 | γ-T | γ-T3 | δ-T | δ-T3 | T | T3 | T + T3 | γ-Ory |
| ERBO | 1583.2 | 1066.9 | 65.1 | 353.2 | 1511.6 | — | 40.9 | 1930.6 | 2684.5 | 4620.9 | 19702 |
| CrRBO | | | | | | | | | | 2084.6 | 10385 |

EXAMPLE 3

CrRBO (50.4 g) was extracted three times by stirring with 150 ml methanol at room temperature (25° C.) for one-half hour each time. The combined methanol extract was concentrated under vacuum to give 15 g (29.76%) ERBO. The residual rice bran oil (31 g, 61.5%) and ERBO were analyzed for tocols and γ-oryzanol. The residual oil showed 276.7 ppm tocols and the ERBO showed the following results:

| HPLC ANALYSIS (ppm) | | | | | | | | | | |
|---|---|---|---|---|---|---|---|---|---|---|
| Product | α-T | α-T3 | β-T3 | γ-T | γ-T3 | δ-T | δ-T3 | T | T3 | T + T3 | γ-Ory |
| ERBO | 1339.5 | 1006.4 | 62.6 | 246.4 | 1141.2 | 53.6 | 37.7 | 1639.5 | 2297.9 | 3887.4 | 18343 |
| CrRBO | | | | | | | | | | 2084.6 | 10385 |

EXAMPLE 4

CrRBO (50 g) was extracted with preheated isopropyl alcohol as described under example 1 and the isopropyl alcohol extract was concentrated under reduced pressure to give 29.6 g (59.2%) of ERBO. HPLC analysis of the ERBO showed 2,957.1 ppm of tocols and 19,683 ppm of γ-oryzanol.

EXAMPLE 5

Refined, bleached, and deodorized rice bran oil (RBO) was subjected, 15 under various process conditions, to short path vacuum distillation (SPVD) through a six kilogram per hour SPVD unit. Process conditions were optimized for maximum isolation and concentration of tocols. Upon analysis it was also determined that conditions for the isolation and concentration of γ-oryzanol were optimized. RBO contained base levels of tocols as shown in the table below. These data further show the enhancement of tocol concentration through the various processing conditions shown in the table below.

| Process Conditions | Starting RBO | Experiment 1 | Experiment 2 | Experiment 3 | Experiment 4 | Experiment 5 |
|---|---|---|---|---|---|---|
| Evaporator Temp. ° C. | | 245 | 250 | 255 | 260 | 290 |
| Vacuum Mm Hg | | 0.002 | 0.002 | 0.002 | 0.003 | 0.006 |
| Distillate % | | 7.9 | 9.3 | 12.0 | 13.2 | 37.7 |
| Total Tocals ppm | 832.5 | 7,307 | 6,208 | 5,807 | 5,710 | 2,133 |

EXAMPLE 6

In a subsequent experiment, data shown in the table below was collected. The process conditions for these data are as follows: a) evaporator temperature was 235° C., b) vacuum pressure was 0.002 mm Hg, and c) distillate percentage was 6.3%. The concentration of γ-oryzanol and the magnitude of the concentrating effect on γ-oryzanol were not anticipated, because the vapor pressure and melting point of the γ-oryzanol are too high for the process conditions used.

| | Starting RBO | SPVD Distillate |
|---|---|---|
| Total Tocols (ppm) | 829 | 10,903 |
| Total γ-oryzanol (ppm) | 1,785 | 16,740 |

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A process for obtaining a rice bran oil having an enhanced anti-oxidant content:
    a) mixing rice bran oil and a lower aliphatic alcohol;
    b) allowing the resulting mixture to settle thereby forming a first oil layer and a first alcohol layer;
    c) separating the first alcohol layer from the first oil layer; and
    d) distilling the first alcohol layer to recover rice bran oil having an enhanced anti-oxidant content.

2. A process according to claim 1 wherein distillation is carried out using a short path vacuum distillation (SPVD) unit.

3. A process according to claim 1 wherein the rice bran oil and the lower aliphatic alcohol are mixed for a period of time in a range of one half hour to one hour.

4. A process according to claim 1 wherein the ratio of lower aliphatic alcohol to rice bran oil is in a range of 2 to 3 ml of lower aliphatic alcohol per gram of rice bran oil.

5. A process according to claim 1 further comprising;
    a) mixing the first oil layer and a lower aliphatic alcohol;
    b) allowing the resulting mixture to settle thereby forming a second oil layer and a second alcohol layer;
    c) separating the second alcohol layer from the second oil layer; and
    d) distilling the second alcohol layer to recover rice bran oil having an enhanced anti-oxidant content.

6. A process according to claim 5 wherein distillation is carried out using a short path vacuum distillation (SPVD) unit.

7. A process according to claim 5 wherein the rice bran oil and the lower aliphatic alcohol are mixed for a period of time in a range of one half hour to one hour.

8. A process according to claim 5 wherein the ratio of lower aliphatic alcohol to rice bran oil is in a range of 2 to 3 ml of lower aliphatic alcohol per gram of rice bran oil.

9. A process according to claim 5 further comprising:.
    a) mixing the second oil layer and a lower aliphatic alcohol;
    b) allowing the resulting mixture to settle thereby forming a third oil layer and a third alcohol layer;

c) separating the third alcohol layer from the third oil layer; and d) distilling the third alcohol layer to recover rice bran oil having an enhanced anti-oxidant content.

10. A process according to claim 9 wherein distillation is carried out using a short path vacuum distillation (SPVD) unit.

11. A process according to claim 9 wherein the rice bran oil and the lower aliphatic alcohol are mixed for a period of time in a range of one half hour to one hour.

12. A process according to claim 9 wherein the ratio of lower aliphatic alcohol to rice bran oil is in a range of 2 to 3 ml of lower aliphatic alcohol per gram of rice bran oil.

13. A process according to claim 9 further comprising:

a) mixing the third oil layer and a lower aliphatic alcohol;

b) allowing the resulting mixture to settle thereby forming a fourth oil layer and a fourth alcohol layer;

c) separating the fourth alcohol layer from the fourth oil layer; and d) distilling the fourth alcohol layer to recover rice bran oil having an enhanced anti-oxidant content.

14. A process according to claim 13 wherein distillation is carried out using a short path vacuum distillation (SPVD) unit.

15. A process according to claim 13 wherein the rice bran oil and the lower aliphatic alcohol are mixed for a period of time in a range of one half hour to one hour.

16. A process according to claim 13 wherein the ratio of lower aliphatic alcohol to rice bran oil is in a range of 2 to 3 ml of lower aliphatic alcohol per gram of rice bran oil.

17. A process according to claim 1 wherein mixing is carried out at a temperature between 5 to 80° C.

18. A process according to claim 17 wherein mixing is carried out at a temperature of 25° C.

19. A process according to claim 1 wherein the lower aliphatic alcohol is C1 to C3 alcohol.

20. A process according to claim 1 wherein separating is done by means of a separation funnel.

21. A process according to claim 1 wherein distillation is done under vacuum at a temperature between about 40° C. and about 60° C.

22. A process for obtaining a rice bran oil having an enhanced anti-oxidant content:

a) mixing rice bran oil and a lower aliphatic alcohol;

b) allowing the resulting mixture to settle thereby forming a first oil layer and a first alcohol layer;

c) separating the first alcohol layer from the first oil layer;

d) mixing the first oil layer and a lower aliphatic alcohol;

e) allowing the resulting mixture to settle thereby forming a second oil layer and a second alcohol layer;

f) separating the second alcohol layer from the second oil layer;

g) combining the first alcohol layer and the second alcohol layer into an alcohol mixture; and h) distilling the alcohol mixture to recover rice bran oil having an enhanced antioxidant content.

23. A process according to claim 22 wherein distillation is carried out using a short path vacuum distillation (SPVD) unit.

24. A process for obtaining a rice bran oil having an enhanced antioxidant content:

a) mixing rice bran oil and a lower aliphatic alcohol;

b) allowing the resulting mixture to settle thereby forming a first oil layer and a first alcohol layer;

c) separating the first alcohol layer from the first oil layer;

d) mixing of the first oil layer and a lower aliphatic alcohol;

e) allowing the resulting mixture to settle thereby forming a second oil layer and a second alcohol layer;

f) separating the second alcohol layer from the second oil layer;

g) mixing the second oil layer and a lower aliphatic alcohol;

h) allowing the resulting mixture to settle thereby forming a third oil layer and a third alcohol layer;

i) separating the third alcohol layer from the third oil layer, j) combining the first alcohol layer, the second alcohol layer, and the third alcohol layer into an alcohol mixture; and k) distilling the alcohol mixture to recover rice bran oil having an enhanced anti-oxidant content.

25. A process according to claim 24 wherein distillation is carried out using a short path vacuum distillation (SPVD) unit.

26. A process for obtaining a rice bran oil having an enhanced antioxidant content:

a) mixing of rice bran oil and a lower aliphatic alcohol;

b) allowing the resulting mixture to settle thereby forming a first oil layer and a first alcohol layer;

c) separating the first alcohol layer from the first oil layer;

d) mixing of the first oil layer and a lower aliphatic alcohol;

e) allowing the resulting mixture to settle thereby forming a second oil layer and a second alcohol layer;

f) separating the second alcohol layer from the second oil layer;

g) mixing the second oil layer and a lower aliphatic alcohol;

h) allowing the resulting mixture to settle thereby forming a third oil layer and a third alcohol layer;

i) separating the third alcohol layer from the third oil layer;

j) mixing the third oil layer and a lower aliphatic alcohol;

k) allowing the resulting mixture to settle thereby forming a fourth oil layer and a fourth alcohol layer;

l) separating the fourth alcohol layer from the fourth oil layer;

m) combining the first alcohol layer, the second alcohol layer, the third alcohol layer and the fourth alcohol layer into an alcohol mixture; and n) distilling the alcohol mixture to recover rice bran oil having an enhanced anti-oxidant content.

27. A process according to claim 26 wherein distillation is carried out using a short path vacuum distillation (SPVD) unit.

28. A process according to claim 26 wherein the process is carried out at a temperature between 5 to 80° C.

29. A process according to claim 28 wherein mixing is carried out a temperature of 25° C.

30. A process according to claim 26 wherein the lower aliphatic alcohol is a C1 to C3 alcohol.

31. A process according to claim 26 wherein separating is done by means of a separation funnel.

32. A process according to claim 26 wherein distillation is done under vacuum at a temperature between about 40° C. and about 60° C.

* * * * *